(12) United States Patent
Malik

(10) Patent No.: US 6,741,679 B1
(45) Date of Patent: *May 25, 2004

(54) SYSTEM AND METHOD FOR CALLING NAME DELIVERY TO VOICEMAIL SYSTEMS

(75) Inventor: Dale W. Malik, Dunwoody, GA (US)

(73) Assignee: Bell South Intellectual Property Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/207,971

(22) Filed: Jul. 31, 2002

Related U.S. Application Data

(63) Continuation of application No. 09/441,464, filed on Nov. 17, 1999, now Pat. No. 6,456,700.

(51) Int. Cl.[7] .............................................. H04M 3/42
(52) U.S. Cl. ............................... 379/88.19; 379/207.15
(58) Field of Search ......................... 379/67.1, 88.18, 379/88.19, 88.2, 88.21, 88.25, 142.06, 201.01, 205.01, 207.01, 207.15, 221.08, 221.09, 221.11

(56) References Cited

U.S. PATENT DOCUMENTS

| | | | | |
|---|---|---|---|---|
| 5,220,599 A | * | 6/1993 | Sasano et al. | 379/142.06 |
| 5,499,290 A | * | 3/1996 | Koster | 379/242 |
| 5,692,038 A | * | 11/1997 | Kraus et al. | 379/207.13 |
| 5,701,301 A | * | 12/1997 | Weisser, Jr. | 370/428 |
| 5,774,533 A | | 6/1998 | Patel | |
| 5,796,806 A | * | 8/1998 | Birckbichler | 379/88.2 |
| 5,850,435 A | * | 12/1998 | Devillier | 379/374.02 |
| 6,094,574 A | * | 7/2000 | Vance et al. | 455/415 |
| 6,393,278 B1 | * | 5/2002 | Buchanan et al. | 455/426 |
| 6,449,351 B1 | * | 9/2002 | Moss et al. | 379/142.09 |
| 2002/0044632 A1 | * | 4/2002 | Kaplan | 379/67.1 |

OTHER PUBLICATIONS

Bellcore Technical Reference NWT–001284, Issue 1, "Advanced Intelligent Newtork (AIN)0.1 Switching Systems Generic Requirements" (Aug. 1992).

* cited by examiner

*Primary Examiner*—Scott L. Weaver
(74) *Attorney, Agent, or Firm*—Shaw Pittman LLP

(57) ABSTRACT

A system and method for providing calling name delivery to a voicemail service subscriber. The system and method use the features of an advanced intelligent network to provide an interface between a voicemail service and a telephone service provider's calling name databases. The present invention advantageously provides this interface using standard call processing techniques without the need to establish a direct data interface between the systems.

17 Claims, 2 Drawing Sheets

SYSTEM AND METHOD FOR CALLING NAME DELIVERY TO VOICEMAIL SYSTEMS

The application is a continuation of 09/441,464 filed Nov. 17, 1999 now U.S. Pat. No. 6,456,700.

BACKGROUND

1. Field of the Invention

The present invention relates generally to telecommunications systems. More particularly, the present invention relates to an advanced intelligent network that provides a system and method for delivering calling name information to a voicemail system subscriber.

2. Background of the Invention

As is well known in the art, voicemail systems ("VMS") are generally accessed by subscribers through a telephone call. That is, a subscriber dials a telephone access number for the VMS and once the call is connected, the subscriber interacts with the VMS service to access voicemail messages. The subscriber normally inputs commands to the VMS service by pressing keys on the telephone to send dual-tone multifrequency ("DTMF") codes. Alternatively, a VMS service may use voice-recognition systems to receive audible commands from subscribers.

Conventional VMS systems are generally capable of delivering the calling party number for stored messages. Thus, a subscriber may receive an announcement from the VMS service such as, "You have one new voicemail message, received from telephone number 111-222-3333." However, voicemail systems cannot provide the calling name associated with voicemail messages unless an extensive calling name database is created and maintained.

Some VMS services can provide limited calling name services when a private branch exchange ("PBX") is used to provide internal telephone systems within an organization. For example, such a private VMS service provide a name associated with a voicemail message, provided the message was left by a caller using a telephone served by the PBX. However, such a VMS service cannot provide the calling name for external callers unless a database of external calling numbers and associated names is maintained. Such calling name databases are well known in the art. However, most calling name databases are maintained by common carrier telecommunications services ("telcos").

Thus a system and method is needed for providing calling name delivery service on a per call basis for subscribers of VMS services.

SUMMARY OF THE INVENTION

The present invention utilizes an Advanced Intelligent Network ("AIN") to provide a system and method for delivering the calling name information associated with a voicemail message to a voicemail system subscriber. AIN systems are described in U.S. Pat. No. 5,701,301, U.S. Pat. No. 5,774,533, Bellcore Specification TR-NWT-001284, Switching Systems Generic Requirements for AIN 0.1 which are incorporated herein by reference in their entirety.

The present invention provides a system and method for interfacing a conventional VMS service with a calling name delivery service. The invention advantageously uses a standard call processing model to deliver the calling name information directly to a VMS subscriber. Thus, the present invention obviates the need for external data interfaces between the VMS service and the telco's calling name databases. Functionally, a subscriber, connected by a telephone call to a VMS service, requests the calling name information associated with a voicemail message, by issuing a command to the VMS. Such a command is sent to the VMS using DTMF or voice commands as currently known in the art. The VMS system conferences a service node ("SN") into the telephone call by dialing a customized dialing plan ("CDP") code and the telephone number associated with the voicemail message. A CDP trigger on the service switching point ("SSP") serving the VMS, causes the SSP to launch a query to a service control point ("SCP") to identify which SN to conference in on the call. The SCP directs the call to a special access number for the appropriate SN based on the telephone number associated with the voicemail message.

Once the SN is conferenced in with the subscriber and the VMS service, the SN immediately provides the calling name for the voicemail message and may receive subsequent commands from the subscriber. For example, the subscriber may wish to have the calling name repeated. After the subscriber is finished listening to the calling name information, the SN hangs up, leaving only the subscriber and the VMS service on the telephone call. The subscriber may continue interacting with the VMS service, and issue commands, including a request for calling name information for the same or subsequent voicemail messages.

The SCP acts as a gatekeeper to restrict access to the SN so that only authorized callers, i.e., authorized VMS services, can obtain calling name information through this system and method. Additionally, the SCP selects the appropriate SN to handle the call based on the telephone number associated with the voicemail message. Due to the large size of a telco's calling name database, the telco may split the database into several parts and store the individual portions of the database on several SNs. Thus, the SCP maintains an index identifying which SN maintains which portion of the database. When a query is sent by the switch to the SCP, the SCP checks this index to determine the new routing instructions for the call. The SCP responds to the query by inserting the special telephone access number for the particular SN in the called party number ("CdPN") field and inserting the telephone number provided by the VMS service in the calling party number ("CgPN") field.

The SN is programmed to answer any calls to the special telephone access number as soon as a call comes in. This minimizes any delays for the subscriber requesting the calling name information. The SN uses the CgPN to look up the calling name information in its database. Upon answering the call, the SN plays a computer generated voice response delivering the calling name information, as described above. Thus, the subscriber receives the calling name information through standard call processing techniques. In a preferred embodiment, the SN is programmed to instruct the subscriber to press a pre-determined digit if the name should be repeated, or to press a different pre-defined number to return to the VMS service.

It is an object of the present invention to provide a system and method for interfacing conventional voicemail services with conventional calling name databases.

It is a further object of the present invention to deliver calling name information to a voicemail subscriber using the existing telephone infrastructure.

These and other objects of the present invention are described in greater detail in the detailed description of the invention, the appended drawings and the attached claims.

DETAILED DESCRIPTION OF THE INVENTION

Figure 1A:
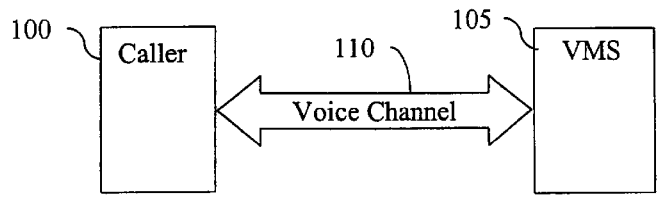
FIGS. 1a–1d are block diagrams showing the interactions between a caller, a voicemail system and a service node when the caller requests and receives a calling name announcement using the present invention.
Figure 1B:
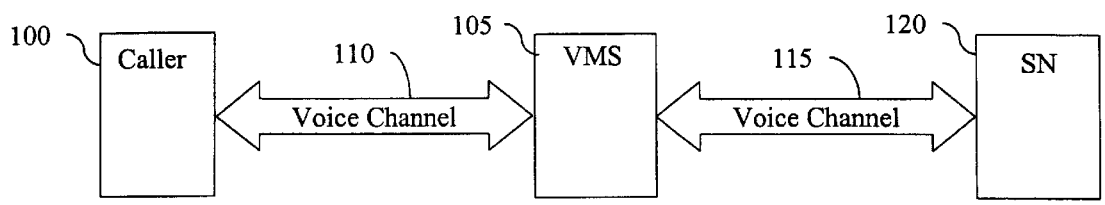
Figure 1C:
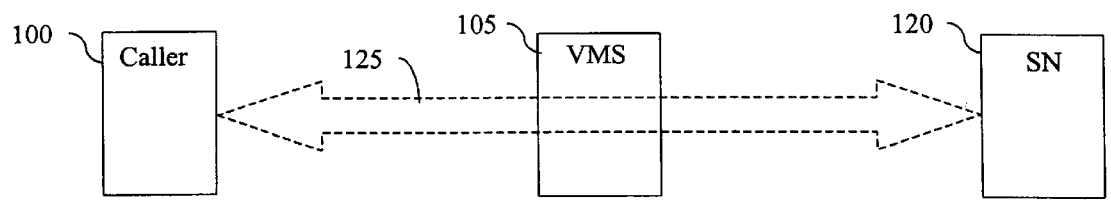

The block diagrams in FIGS. 1a–1d provide a functional description of the present invention. As shown in FIG. 1a, caller 100 connects to a voicemail system, VMS 105, through a telephone call, i.e., voice channel 110. Caller 100 communicates with VMS 105 using the voice channel to issue commands to VMS 105, e.g., play, delete, save, or replay a message. Using the system and method of the present invention, when caller 100 requests the calling name information associated with a voicemail message, VMS 105 conferences SN 120 into the telephone call via voice channel 115, as shown in FIG. 1b. Since voice channel 115 represents a conference call, it functionally extends voice channel 110 to a voice channel between caller 100 and SN 120, shown schematically as voice channel 125 in FIG. 1c.

Figure 1D:
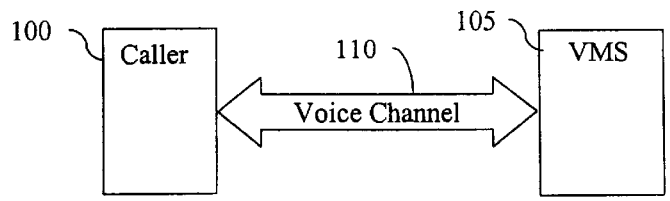

When voice channel 125 is established, the telephone number associated with the voicemail message is passed on to SN 120 as described below. Thus, when SN 120 receives the telephone call, SN 120 looks up the calling name in its databases. SN 120 plays a message over voice channel 125 announcing the calling name information to caller 100. SN 120 remains connected to caller 100 and VMS 105 until caller 100 instructs SN 120 to disconnect voice channel 115. When voice channel 115 is disconnected, SN 120 drops out of the telephone call leaving only voice channel 110 between caller 100 and VMS 105, as shown in FIG. 1d. Caller 100 can continue issuing instructions to VMS 105, including a new request for calling name information as described above.

Figure 2:
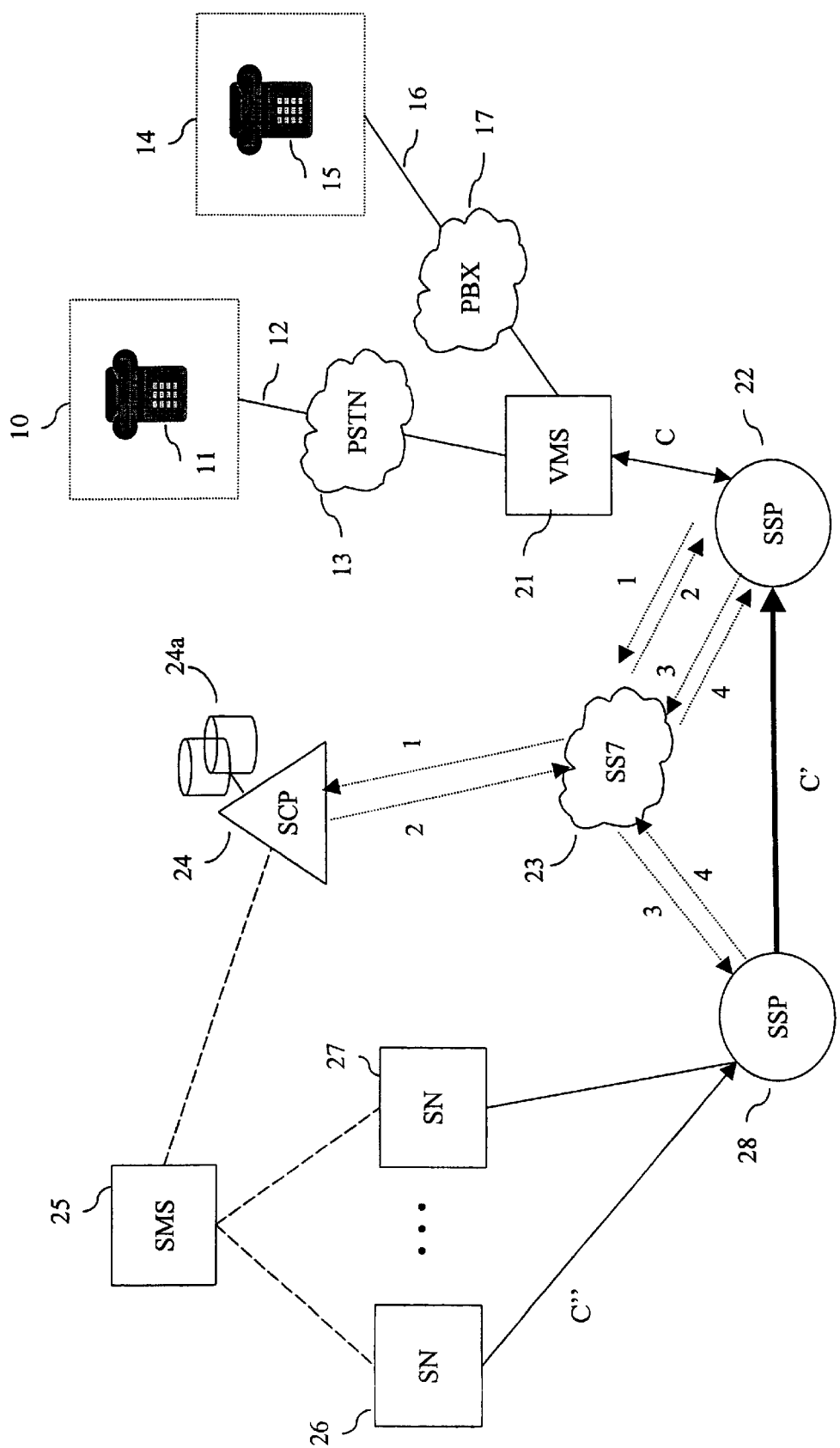
FIG. 2 is a schematic diagram showing the key components of an AIN used in an embodiment of the present invention.

FIG. 2 is a schematic diagram showing the interaction between components of the AIN used to implement an embodiment of the present invention. Caller 10 is a subscriber of VMS service provider 21. The present invention allows caller 10 to request calling name information for any calling parties leaving messages on VMS 21 for caller 10. In a preferred embodiment, caller 10 calls VMS 21 using telephone 11 and line 12. As shown in FIG. 2, caller 10 may connect to VMS 21 through public switched telephone network ("PSTN") 13. Alternatively, a caller, such as caller 14, may connect to VMS 21 using telephone 15 and line 16, connected to PBX 17 as shown in FIG. 2. In either case, the present invention provides the calling name information to the caller upon request.

The caller requests the calling name information as an option on VMS 21. That is, upon listening to a voicemail message, if the caller wants to know the identity of the person leaving the message, the caller enters a code recognized by VMS 21 as a request for calling name delivery. Upon receipt of the request, VMS 21 dials the CDP code and the telephone number from which the message was received. For example, suppose a message was left for caller 10 on VMS 21 from a telephone with a calling number of 222-333-444. Suppose further that VMS 21 is programmed to instruct caller 10 to enter the code "3" to receive the calling name information. Finally, suppose the CDP code assigned by the telco for the system of the present invention is "9." Then, if caller 10 enters "3" during or immediately after listening to the message, VMS 21 initiates a telephone call, i.e., establishes voice channel C, by dialing the following digits: 92223334444#. The first digit is the CDP code, the next ten digits are the telephone number to be analyzed, and the # is used to delimit the end of the string.

SSP 22 receives the dialed digits and, in response to the CDP code, sends an $Info_{13}$ Analyzed query, query 1, to SCP 24 (via Common Channel Signaling System 7 ("SS7") Network 23). Query 1 contains the string of digits received from VMS 21. SCP 24 uses the information received to determine which SN to direct the call to. As shown in FIG. 2, the calling name database may be divided into one or more parts and housed on multiple SNs. The database master is managed by Service Management System ("SMS") server 25 which updates the databases maintained on each SN as required. SMS 25 also provides SCP 24 with information needed to maintain an index for tracking the range of calling numbers stored on each SN.

Thus, in the present example, suppose SN 26 has the calling name database for all calling numbers between 000-000-0000 and 333-333-3333 and SN 27 has the calling name database for all calling numbers between 777-777-7777 and 999-999-9999. The calling name databases for numbers within other ranges would be on other SNs, not shown in FIG. 2. In this case, SCP 24 would determine that the calling party name information is stored on SN 26. SCP 24 issues response 2 to SSP 22 directing the telephone call to SN 26. Response 2 comprises an Analyze_Route message having the telephone access number for SN 26 in the CdPN field and the telephone number to be looked up, i.e., "2223334444," in the CgPN field.

As shown in FIG. 2, SN 26 is served by SSP 28. Thus, SSP 22 sends call setup message 3 to SSP 28 via SS7 network 23. SSP 28 completes the call setup in response 4 and establishes voice channel C'. As discussed above, SN 26 answers the call as soon as it arrives, thus completing voice channel C". As discussed above, a telephone call, i.e., voice channel C–C'–C", is established between caller 10 and SN 26. In a preferred embodiment, caller 10 hears little or no ringing upon connection of this call. SN 26 uses the CgPN information from the call setup message to look up the calling name information. SN 26 plays a computer generated voice message over voice channel C–C'–C" to caller 10. The message is an audible message providing caller 10 with the calling name associated with the voicemail message left on VMS 21.

In a preferred embodiment, the SN also plays a message informing caller 10 how to repeat the message or how to return to VMS 21 to retrieve more voicemail messages.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What I claim is:

1. In a voice mail system in which a voice mail message including an associated calling number has been left for a voice mail system subscriber, a method of providing calling name information associated with the calling number to the voice mail system subscriber, the method comprising:

(a) capturing the calling number associated with the voice mail message;

(b) identifying a calling name with the calling number by utilizing signaling facilities of the public switched telephone network by employing a customized dialing plan code to trigger a service switching point to perform a function that comprises launching a query to a service control point;

(c) directing a call to a service node based on the calling number; and (d) conveying the calling name to the voice mail system subscriber.

2. The method of claim 1, wherein the service node plays the calling name to the voice mail system subscriber.

3. The method of claim 1, wherein the voice mail system subscriber initiates at least one of steps (a)–(d).

4. A method of providing calling name information in a voice mail system, the method comprising:

(a) storing a plurality of calling numbers and associated calling names in a database;

(b) passing one of the calling numbers from a voice mail system via the public switched telephone network to the database and selecting a corresponding calling name; and (c) passing the corresponding calling name from the database to the voice mail system via the public switched telephone network.

5. The method of claim 4, wherein the step of passing one of the calling numbers comprises utilizing a signaling system of the public switched telephone network.

6. The method of claim 5, further comprising establishing a connection among a telephone service switching point, a service control point and a service node.

7. The method of claim 4, further comprising establishing a voice channel between a service node and the voice mail system.

8. The method of claim 7, further comprising establishing a conference call among a voice mail system subscriber, the voice mail system and the service node.

9. A method of obtaining and announcing a calling name associated with a calling number that has been stored on a voice mail system, the method comprising:

(a) receiving a request for a calling name associated with a calling number that has been stored on a voice mail system;

(b) placing a call to a service switching point (SSP), the call including a customized dialing plan (CDP) code and the calling number;

(c) routing the call to a service node (SN) that is operable to access a database that stores a plurality of calling numbers and corresponding calling names;

(d) selecting a calling name based on the calling number; and (e) announcing the calling name corresponding to the calling number.

10. The method of claim 9, wherein a voice mail system subscriber initiates the request for the calling name.

11. The method of claim 9, wherein the step of routing the call to a service node (SN) comprises utilizing signaling facilities of the public switched telephone network.

12. The method of claim 9, further comprising re-announcing the calling name corresponding to the calling number.

13. The method of claim 9, further comprising establishing a conference call among a voice mail system subscriber, the voice mail system and the service node.

14. A method of announcing to a voice mail system subscriber a calling name associated with a calling number that has been recorded on a voice mail system, the method comprising:

(a) establishing a conference call between a voice mail subscriber, a voice mail system and a service node of the public switched telephone network;

(b) passing a calling number from the voice mail system to the service node;

(c) determining a calling name corresponding to the calling number; and (d) announcing the calling name over the conference call to the voice mail subscriber.

15. The method of claim 14, wherein a customized dialing plan (CDP) code is employed to initiate the conference call.

16. The method of claim 14, wherein the voice mail subscriber initiates the method.

17. The method of claim 14, further comprising writing the calling number in a calling party field of a call setup message and a telephone access number for the service node in a called party field of the call setup message.

* * * * *